Patented Apr. 17, 1928.

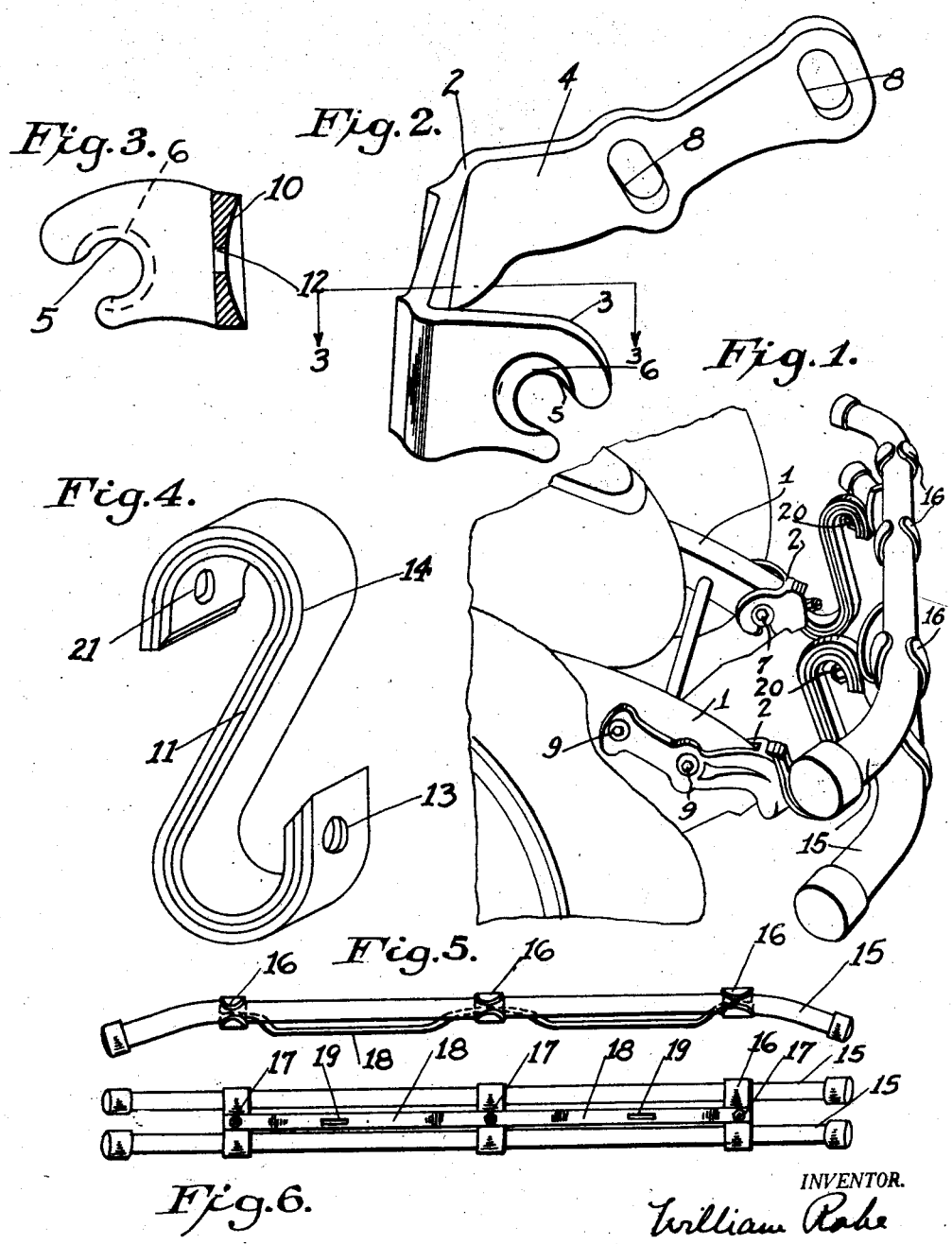

1,666,754

UNITED STATES PATENT OFFICE.

WILLIAM RAHE, OF CINCINNATI, OHIO.

AUTOMOBILE BUMPER.

Application filed July 21, 1926. Serial No. 123,995.

My invention relates to automobile bumpers particularly of the bar and double bar type, and has application specifically to means for supporting bumpers of the double bar type.

It is one of the objects of my invention to provide a plurality of S-shaped springs made up of a plurality of leaves so supported that relative movement between the leaves is possible. It is a further object to support the S-shaped springs which carry a double bar bumper so that shearing strain on supporting bolts is reduced to a minimum. A further object is the provision of an adjustable spring member attached to clips for engaging the bumper bars which will tend to evenly distribute the force of a blow against the bumper uniformly throughout the supporting structure.

The above and other objects which will appear during the course of the ensuing description are made possible by that construction and arrangement of parts of which the drawing illustrates a preferred embodiment.

Referring to the drawings:—

Figure 1 is a perspective view of the double bar type of bumper mounted on the front of an automobile.

Figure 2 is a perspective view of a clip or bracket for supporting the bumper.

Figure 3 is a section along the lines 3—3 of Figure 2, showing the curved channel for engaging an S-shaped spring.

Figure 4 is a perspective view of one of the S-shaped spring supports.

Figure 5 is a plan view of the bumper detached from the automobile.

Figure 6 is a back view showing the lateral spring support which provides a laterally adjustable support for the clips for engaging the bars.

Generally indicated at 1 are the channels of the frame of an automobile. Brackets which are attachable to the frame of the automobile are generally indicated at 2. The inner brackets have spaced arms 3 and 4, the inner spaced arms having a groove 5 with flat bearing surfaces 6 for engaging the heads of shackle bolts 7, which secure the automobile springs to the channels of the frame, and the outer arms having more than one elongated aperture such as are indicated at 8 for engaging holes drilled in the frame, through which bolts 9 may be used for an additional support for the bracket. It should be noted in this bracket support, that I have provided means for supporting a bumper which has one arm which can be adjustably mounted on any type of automobile as the method of supporting automobile springs with shackle bolts is standard, and another arm which by the positioning of the apertures 8 may be attached to an automobile frame in a great many different positions after the drilling of holes in the frame.

The brackets have curved channels 10, which engage the S-shaped springs 11, which are employed for resiliently carrying the bumper. Bolt holes 12 extend inwardly from the face of the curved channels, and bolts of desired type are extended through oval shaped holes 13 in he S-shaped springs for securing the springs to the brackets. The use of oval shaped bolt holes in the S-shaped springs accomplishes an important function, as it allows the plurality of spring leaves 14, which make up the S-shaped springs to have relative movement each leaf with relation to an adjoining leaf.

The double bars 15 of the bumper are supported directly by clips 16, which are secured with bolts 17 to a spring piece 18 extending longitudinally between the bars. The spring piece has slots 19 through which bolts 20 may be secured to mount the bumper on the S-shaped springs. The S-shaped springs have oval apertures 21 through which the bolts 20 pass, which allows for movement of one spring leaf with relation to another.

The whole assembly, by means of the combination of the longitudinal spring piece 18 and the S-shaped spring supports 11, is thus arranged so that a shock on the bumper will be communicated throughout the whole supporting structure, and the curved channels which seat the ends of the S-shaped springs avoid the tendency of shearing off the bolts which provide the connection between the S shaped springs and the supporting brackets.

Having thus described my invention what I claim as new and desire to secure by Letters Patent is:—

1. In combination in a double bar bumper, double bars and clamps for engaging the double bars, a resilient member extending in alignment with the bars between the bars engaging said clamps, brackets adjustably secured to an automobile frame, S-shaped springs composed of pluralities of S-shaped leaves secured to said brackets, one spring to one bracket, and adjustable connections between the S-shaped springs and the resilient member.

2. In combination in a double bar bumper, double bars and clamps for engaging the double bars, a resilient member extending in alignment with the bars between the bars and engaging said clamps, brackets adjustably secured to an automobile frame, S-shaped springs composed of pluralities of S-shaped leaves secured to said brackets, one spring to either bracket, and adjustable connections between the S-shaped springs and the resilient member, said brackets provided with means for the adjustable attachment thereof to an automobile frame.

3. In combination in a double bar bumper, double bars and clamps for engaging the double bars, a resilient member extending in alignment with the bars between the bars and engaging said clamps, brackets adjustably secured to an automobile frame, S-shaped springs composed of pluralities of S-shaped leaves secured to said brackets, one spring to either bracket, and adjustable connections between the S-shaped springs and the resilient member, said brackets having channels with rounded bearing surfaces for engaging said springs.

4. A resilient support for a bumper comprising a bracket for securing the support to an automobile frame, and an S-shaped spring composed of a plurality of leaves, with means adapted to engage the spring to said bracket, said means comprising a rigid shanked member with apertures of elongated nature extended through said springs for engaging said rigid shanked member and thus providing an engagement which allows relative movement of the leaves one with relation to another.

5. A resilient support for a bumper comprising a bracket for securing the support to an automobile frame, and an S-shaped spring composed of a plurality of leaves, with means adapted to engage the spring to said bracket, said bracket having a groove and a flattened surface for engaging a shackle bolt on the automobile frame, and elongated apertures for engaging bolts extended from said automobile frame.

6. A bumper for an automobile comprising a bar, a clamp for engaging the bar, a member extending longitudinally in alignment with said bar for attachment to said clamp, a bracket provided with means for adjustably securing same to an automobile frame, and an S-shaped spring composed of a plurality of S-shaped leaves adapted to connect said bracket and said member.

7. A bumper for an automobile comprising a bar, a clamp for engaging the bar, a member extending longitudinally in alignment with said bar for attachment to said clamp, a bracket provided with means for adjustably securing same to an automobile frame, and an S-shaped spring composed of a plurality of S-shaped leaves adapted to connect said bracket and said member, and said member having elongated slots therein providing an adjustable connection with said S-shaped spring.

8. A bumper for an automobile comprising a bar, a clamp for engaging the bar, a member extending longitudinally in alignment with said bar for attachment to said clamp, a bracket provided with means for adjustably securing same to an automobile frame, and an S-shaped spring composed of a plurality of S-shaped leaves adapted to connect said bracket and said member, said bracket having a connection with said S-shaped spring adapted to yield slightly under the strain of a blow on said bumper.

9. A bumper for an automobile comprising a bar, a clamp for engaging the bar, a member extending longitudinally in alignment with said bar for attachment to said clamp, a bracket provided with means for adjustably securing same to an automobile frame, and an S-shaped spring composed of a plurality of S-shaped leaves adapted to connect said bracket and said member, said bracket having a connection with said S-shaped spring adapted to yield slightly under the strain of a blow on said bumper, and said spring at its connecting point with said member having an elongated aperture for retaining a rigid member extended through said longitudinally extended member, whereby movement of the leaves of said S-shaped spring one with relation to another may be permitted.

WILLIAM RAHE.